United States Patent [19]

Hawkins et al.

[11] Patent Number: 4,669,703
[45] Date of Patent: Jun. 2, 1987

[54] WHEELED HOIST

[76] Inventors: Joel W. Hawkins, P.O. Box 627, Travelers Rest, S.C. 29690; Patrick G. Hawkins, P.O. Box 3867, Greenville, S.C. 29608

[21] Appl. No.: 761,175
[22] Filed: Jul. 31, 1985
[51] Int. Cl.⁴ .............................................. B60P 1/48
[52] U.S. Cl. .................................... 254/8 B; 254/124
[58] Field of Search ...................... 254/8 R, 8 B, 124; 269/16

[56] References Cited

U.S. PATENT DOCUMENTS

| | | | |
|---|---|---|---|
| 3,521,860 | 7/1970 | Zehrung et al. | 254/8 R |
| 3,931,956 | 1/1976 | Hawkins | 254/8 B |
| 4,021,017 | 5/1977 | Adams | 254/124 |
| 4,479,632 | 10/1984 | McIntyre et al. | 254/8 B |

Primary Examiner—Robert C. Watson
Attorney, Agent, or Firm—Bailey & Hardaway

[57] ABSTRACT

A wheeled hoist is illustrated having a base portion which may be readily disassembled for shipment having a tray forming a transverse frame for carrying a rearwardly inclined post or standard and a longitudinal base portion, all supported by wheels. The post carries a boom which may be mounted directly within the post to be raised and lowered, and the post is removably mounted to distribute an axial load to the base.

7 Claims, 3 Drawing Figures

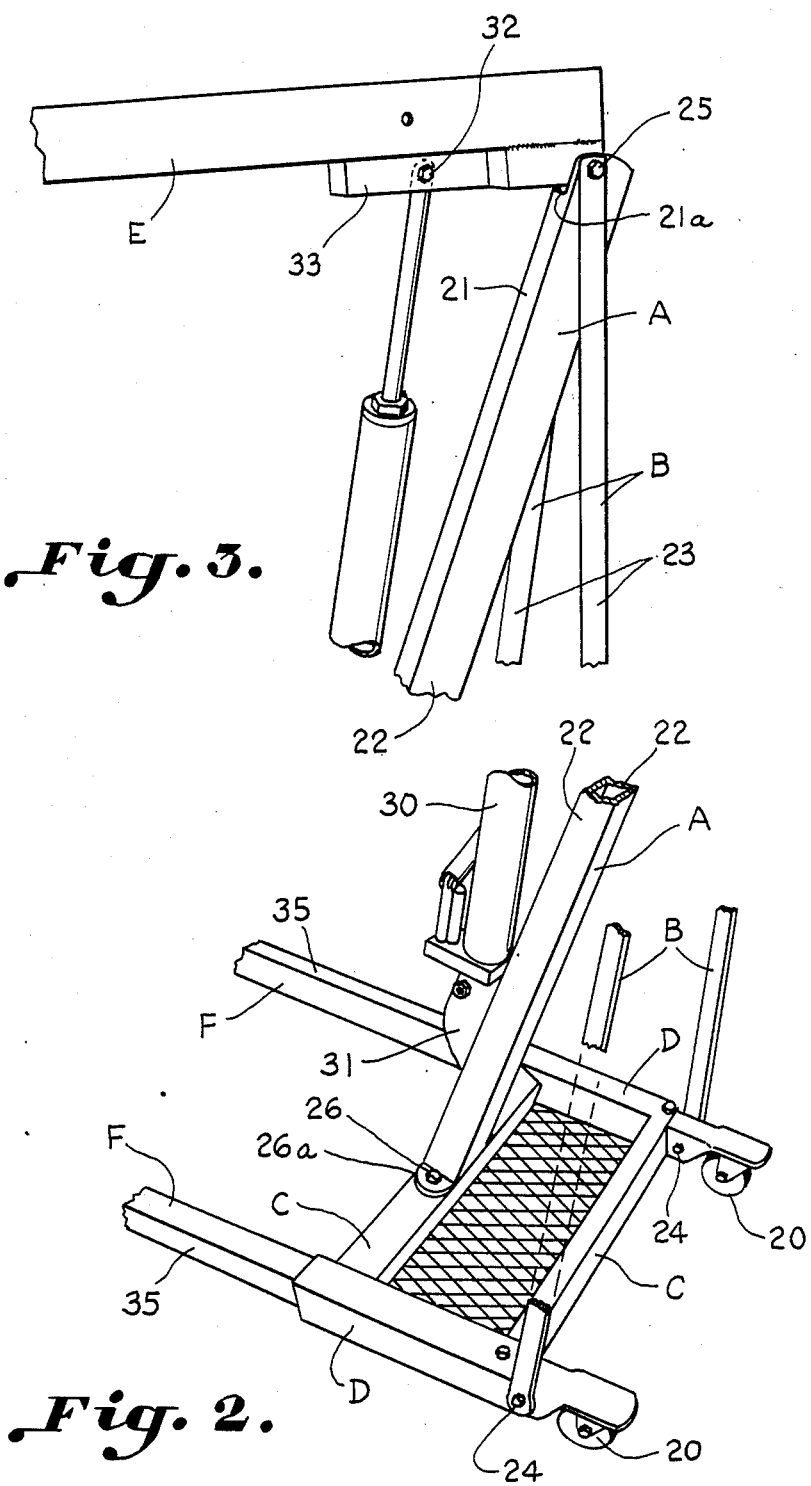

1

WHEELED HOIST

BACKGROUND OF THE INVENTION

A hoist is illustrated in U.S. Pat. No. 3,931,956 wherein a post or standard carries a boom pivotally mounted in a U-shaped bracket member at the top of the post.

An important object of this invention is to provide a hoist having a base which may be readily assembled and disassembled and which includes a tray for supporting the post while acting as a frame and providing a support for receiving an axial load, while at the same time carrying a boom directly mounted in the post at the top.

SUMMARY OF THE INVENTION

A hoist is illustrated having a base which may be easily disassembled and which includes a tray which serves as a frame member. The post or standard for carrying the boom may be mounted directly to a structural member forming a part of the tray but which has a surface carried at right angles to the post for receiving an axial bearing load. The top of the post has a right angle cut as at the bottom to conserve material since the post need only be cut square or at right angles at each end. The boom is mounted in a slot within the tubular post without the necessity of utilizing the usual U shaped supports at the top.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a perspective view looking toward the lower rear portion of the hoist illustrated in FIG. 1, and FIG. 3 is a perspective view looking toward the front side section of the boom mounted at the top of the post.

DESCRIPTION OF A PREFERRED EMBODIMENT

Figure 1:
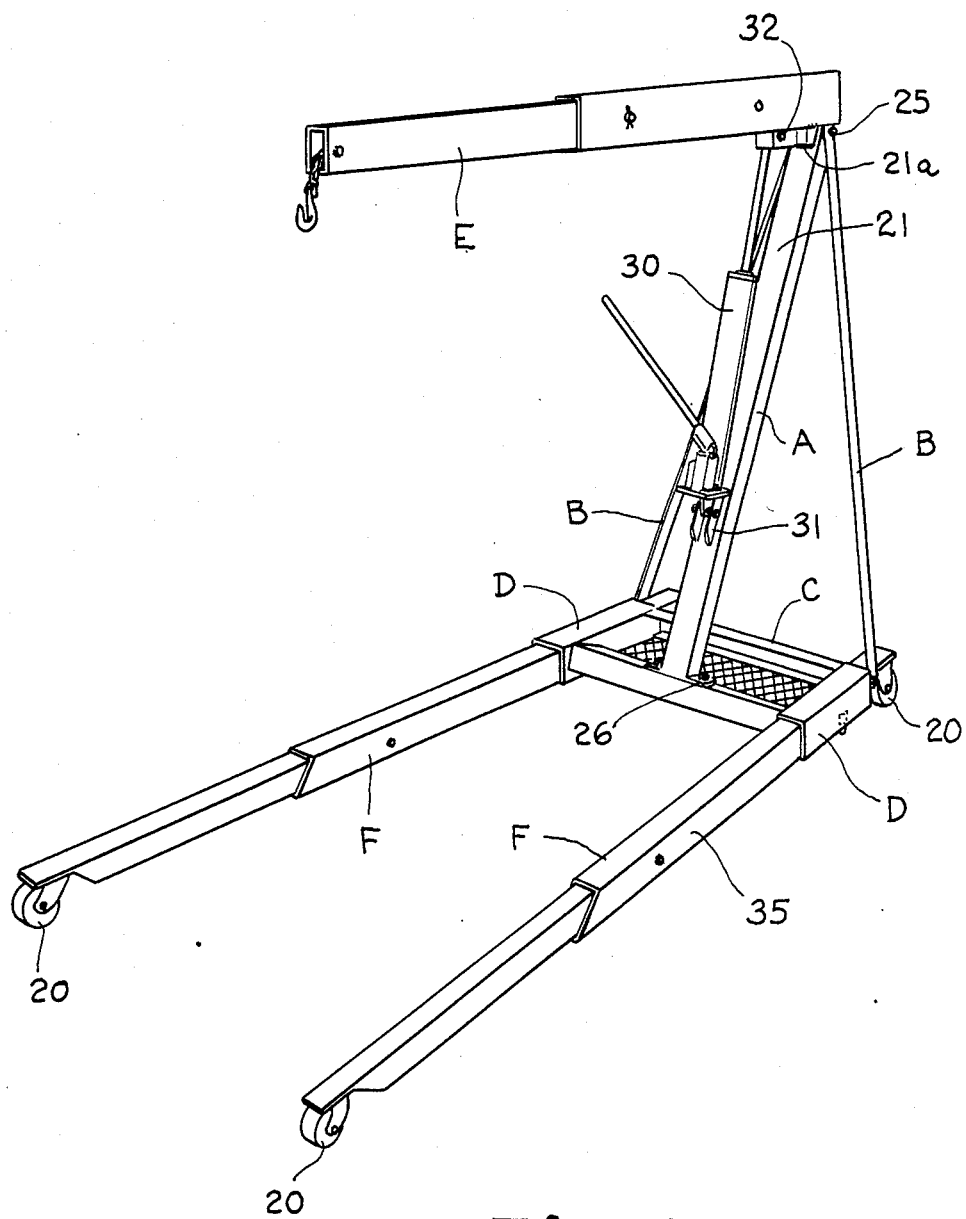
FIG. 1 is a perspective view looking toward the front illustrating a hoist constructed in accordance with the present invention.

A wheeled hoist is illustrated having a base formed from a transverse base member, and a longitudinal base portion extending forwardly from said transverse base member. The base is supported by wheels. A post A is carried by the base and is inclined rearwardly toward the transverse base portion. Means B support the post and are carried by the transverse base member on one end and taper inwardly toward and are removably connected to the post on the other end. One of a pair of transverse structural sections C forms a part of the base, having a surface at substantially a right angle to the post. Fastening means D removably secure the post to the surface at substantially a right angle thereto to transmit an axial load in bearing thereon.

A boom E is mounted to be raised and lowered carried adjacent an upper end of said post extending outwardly above and in alignment with said longitudinal base portion. The longitudinal base portion includes a pair of structural members F extending outwardly from the transverse base member in generally longitudinal alignment. Fastening means G removably secure the pair of structural members to the transverse base member.

The base is supported by wheels 20. The A post carried by the base is constructed as a tubular member having a front face 21 bridging sides 22.

Means B include straps 23 secured by bolts 24 supporting the post carried by the base on one end and tapering inwardly toward and being removably connected to said post by bolts 25 on the other end. The transverse base member includes a pair of longitudinally spaced transverse structural sections C. A pair of end frame members D bridge the longitudinally spaced transverse structural sections and are integrally connected thereto as by welding forming a support frame. Fastening means 26 removably secure the post to the support frame.

A boom E is mounted to be raised and lowered carried adjacent an upper end of the post extending outwardly above and in alignment with said longitudinal base portion. The boom is raised and lowered by the fluid operated cylinder 30 mounted on one end as at 31 is on the post A and having connection on the other end through the rod at 32 to the boom. The longitudinal base portion include a pair of structural members F, extending outwardly from the transverse base member in generally longitudinal alignment, tapering slightly outwardly in a horizontal plane. Fastening means G removably secure the pair of structural members to the transverse base member.

A transverse structural section C forms a part of the tray having a surface at substantially a right angle to the post, the fastening means securing the post to said surface as by the bolts 26 passing through the bracket 26a. The post is constructed of a tubular structural member and a slot 21a in a front face 21 of the tubular member carries a pivotal mounting, including the bolt 32, extending across the slot, and abutment means 33 fixed to the boom carried by the pivotal mounting. The end frame members D are tubular members removably receiving the pair of structural members 35 therein. Extension members 35a and the members 35 form the longitudinal base portion.

While a preferred embodiment of the invention has been described using specific terms, such description is for illustrative purposes only, and it is to be understood that changes and variations may be made without departing from the spirit or scope of the following claims.

What is claimed is:

1. A wheeled hoist having a base formed from a transverse base member, and a longitudinal base portion extending forwardly from said transverse base member; said base being supported by wheels, comprising:
  a post carried by said base and being inclined rearwardly toward said transverse base member;
  means supporting said post carried by said transverse base member on one end and tapering inwardly toward and being removably connected to said post on the other end;
  one of a pair of transverse structural section forming a part of said base having a surface at substantially a right sngle to said post;
  fastening means removably securing said post to said surface at substantially a right angle thereto to transmit an axial load in bearing thereon;
  a boom mounted to be raised and lowered carried adjacent an upper end of said post extending outwardly above and in alignment with said longitudinal base portion;
said longitudinal base portions including
a pair of structural members extending outwardly from said transverse base member in generally longitudinal alignment;
said structural members being each removably received by said transverse base member; and
fastening means removably securing said pair of structural members to said transverse base member whereby said wheeled hosit may be readily disassembled for shipment.

2. A wheeled hoist having a base formed from a transverse base member, and a longitudinal base portion extending forwardly from said transverse base member; said base being supported by wheels, comprising:
 a post carried by said base and being inclined rearwardly toward said transverse base portion member;
 means supporting said post carried by said base on one end and tapering inwardly toward and being removably connected to said post on the other end;
 said transverse base member including
 a pair of longitudinally spaced transverse structural sections;
 a pair of end frame members bridging said longitudinally spaced transverse structural sections and being integrally connected thereto forming a support frame;
 fastening means removably securing said post to said support frame;
 a boom mounted to be raised and lowered carried adjacent an upper end of said post extending outwardly above and in alignment with said longitudinal base portion;
 said longitudinal base portion including,
 a pair of structural members extending outwardly from said transverse base member in generally longitudinal alignment;
 said structural members being each removably received by a respective end frame member; and
 fastening means removably securing said pair of structural members to said transverse base member;
 whereby said wheeled hoist may be readily disassembled for shipment.

3. The structure set forth in claim 2, including a bottom in said frame forming a tray.

4. The structure set forth in claim 2, including mounting means for raising and lowering said boom carried within an upper end of said post.

5. The structure set forth in claim 3, including a transverse structural section forming a part of said tray having a surface at substantially a right angle to said post, said fastening means securing said post to said surface.

6. The structure set forth in claim 2 wherein said post is constructed of a tubular structural member, a slot in a front face of said tubular member, a pivotal mounting carried by said post extending across said slot, and means fixed to said boom carried by said pivotal mounting.

7. The structure set forth in claim 2 wherein said end frame members are tubular members removably receiving said pair of structural members therein.

* * * * *